United States Patent [19]

Dunn et al.

[11] 4,162,370

[45] Jul. 24, 1979

[54] CURRENT CARRYING HOSE ASSEMBLY

[75] Inventors: George T. Dunn; Alcide W. Choiniere, both of Abbeville, S.C.

[73] Assignee: Automation Industries, Inc., Los Angeles, Calif.

[21] Appl. No.: 809,905

[22] Filed: Jun. 24, 1977

[51] Int. Cl.² .................. A47L 9/24; F16L 11/11; F16L 11/12

[52] U.S. Cl. .................. 174/47; 138/122; 138/129; 339/15

[58] Field of Search .......... 174/47, 117 F; 339/15, 339/16 R; 340/320; 138/103, 109, 122, 129, 131, 132, 133, 134

[56] References Cited

U.S. PATENT DOCUMENTS

| | | | |
|---|---|---|---|
| 2,890,264 | 6/1959 | Duff | 174/47 |
| 3,034,085 | 5/1962 | Pauler et al. | 339/16 R |
| 3,127,227 | 3/1964 | Edwards | 339/15 |
| 3,277,231 | 10/1966 | Downey et al. | 138/129 X |
| 3,553,629 | 1/1971 | Brown et al. | 174/47 X |
| 3,928,715 | 12/1975 | Holden | 138/103 X |
| 4,063,790 | 12/1977 | Kleykamp et al. | 339/16 R |

FOREIGN PATENT DOCUMENTS

| | | | |
|---|---|---|---|
| 834353 | 8/1938 | France | 174/117 F |
| 1019370 | 2/1966 | United Kingdom | 138/122 |
| 1310737 | 3/1973 | United Kingdom | 174/47 |

*Primary Examiner*—Laramie E. Askin
*Attorney, Agent, or Firm*—Anthony W. Karambelas

[57] ABSTRACT

The hose assembly, preferably for use as a flexible hose for a vacuum cleaner or the like, includes a pair of side by side electrical conductors helically wound integrally within the hose. Each conductor is doubly insulated. A tubular coupling cuff is screwed onto one end of the hose for coupling the hose to other equipment. The cuff is molded with a recessed area on the inner diameter thereof. Wire connectors between conductors in the hose and wires in an electrical wiring harness are mounted in a strain relief molded onto the harness and mounted in the recess so that when the harness is pulled, the wires thereof will not become disconnected from the conductors of the current carrying hose.

11 Claims, 6 Drawing Figures

CURRENT CARRYING HOSE ASSEMBLY

BACKGROUND

This invention is directed to a current carrying hose assembly particularly for the use as a flexible hose for a vacuum cleaner, where electric current and fluid flow pass through the same flexible member.

One specific type of vacuum cleaner is referred to as the tank type which has a vacuum hose connected to a tank at one end and the other end may be, for example, coupled to a cleaning tool. This cleaning tool may have a rotatable brush and an electric motor therein for rotating the brush. The brush works and agitates the area being cleaned at the same time it is vacuumed so that loosened dirt material is picked up and drawn into the flexible hose and emptied into the vacuum cleaner tank.

In the usual embodiment an electric motor driven vacuum fan is placed in the tank and it is electrically connected to an electric supply by an electric input cord which supplies power to drive the vacuum fan. It is next necessary to provide electric current to the electric motor in the cleaning tool for rotation of the rotary brush. This is either by a separate pair of wires or by electrical wires helically wound integrally within the flexible hose.

In some embodiments, the electrical conductors within the hose themselves provide the very spring which makes the hose flexible so that it will bend in a desired shape without collapsing of the hose. In such a case, the wires may be stiffened by and insulated with a coating of polyvinyl chloride, for example.

In some prior art devices, two separate vinyl coated wires are helically wound in a two start helix so that each wire is helically spaced from the other wire.

A polyvinyl chloride cover is wrapped wround the spaced wires or may be extruded in the manner well known to those skilled in the art. The prior art tubes are normally in the form of two single insulated copper conductor wires for the helices and a thermoplastic film for the vacuum tube which forms the hose. End fittings are then molded to the hose so that the hose can then be fitted to other equipment, for example, to the tank of the vacuum cleaner on one end and to the rotating brush pickup head on the other.

In manufacture of these prior art flexible hoses, the process involves two parallel conductive wires wound simultaneously around the mandrel in two helices. The mandrel is then fed to a crosshead extruder where a film of thermoplastic is extruded over the wires to form the cover of the hose. Hoses with fixed end fittings can only be manufactured in the same length as the mandrels. The wiring harness is connected to the helical conductors with insulated connectors. The hose end and harness are then placed in a mold cavity and the end fittings are molded around the end of the hose, capturing and covering the two connectors. This, of course, provides the basic disadvantage that one cannot visually inspect the wiring connectors after the end fittings are molded. The connectors are not separated from each other before the end fittings are molded on so that short circuit problems do occur. Molded hose ends cannot be repaired in the field by qualified repairmen. This type of prior construction is represented by Holden, U.S. Pat. No. 3,928,715 and Pauler et al, U.S. Pat. No. 3,034,085.

The present invention overcomes the aforementioned disadvantages of the prior art and provides a new and improved current carrying hose assembly which can be made in any length desired and includes strain reliefs which are locked into the end fittings keeping the wire connectors secure, and mechanically and permanently separated from each other. The conductors, as provided in the present invention, are double insulated and can be inspected to insure good connection of conductors and wiring harnesses after end fittings have been assembled. The end fittings and hose assemblies can be repaired in the field at any time by qualified repairmen.

SUMMARY

In order to aid in the understanding of this invention, it can be stated in essentially summary form that it is directed to current carrying hose assembly wherein a pair of electric conductor wires are wound in a single helix and formed into the fluid carrying hose by the application of multiple film layers. The hose has a separately formed harness at each end with the harness including a strain relief body and the hose coupling cuff incorporating a strain relief recess so that harness wire strain is taken on the hose coupling.

Accordingly, it is an object of this invention to provide a current carrying hose assembly which is economical to manufacture, incorporates appropriate strain relief and which is of long, trouble-free life. It is another object to provide a current carrying hose which has a pair of double insulated wires wound in a single helix to enhance hose strength and stiffness. It is a further object to provide a hose construction wherein multiple film layers together with reinforcing strands are built up over the wire helix to provide a strong, abrasion-resistant hose of long life.

It is a further object to provide suitable interconnections between the helical conductors of the hose and the end harnesses so that reliable, permanent interconnection therebetween is achieved and strain relief is incorporated for the interconnection. It is a further object to provide a hose coupling cuff which attaches to the hose and attaches to the harness strain relief to take up strain on the harness so that it is not transmitted to the connectors.

Other objects and advantages of this invention will become apparent from a study of the following portion of this specification, the claims and the attached drawings.

DESCRIPTION OF THE PREFERRED EMBODIMENT

Figure 1:
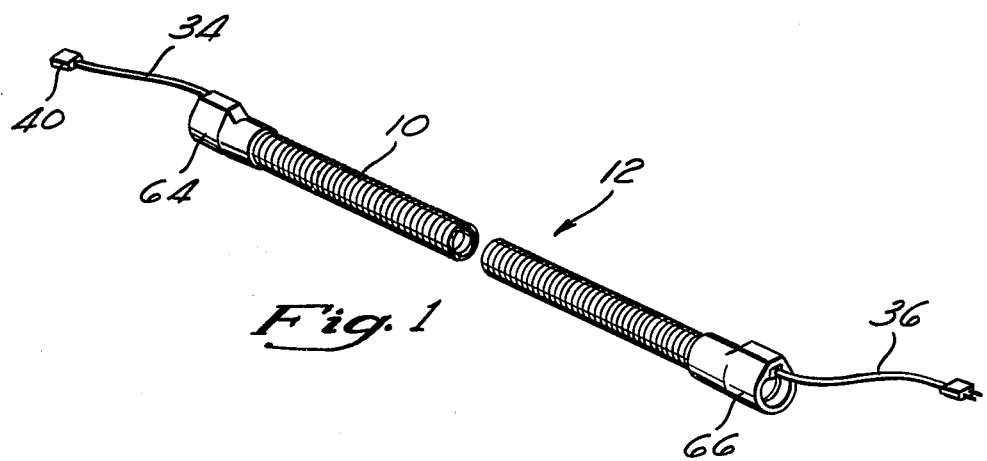
FIG. 1 is a perspective view, with parts broken away, of the current carrying hose assembly of this invention.
Figure 2:
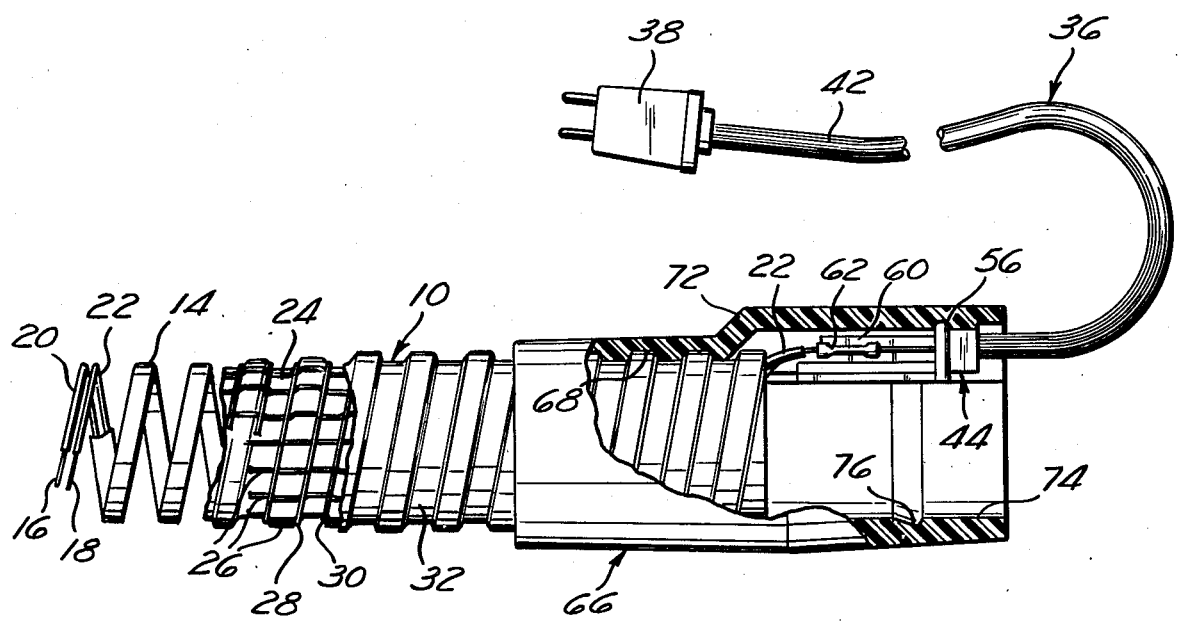
FIG. 2 is an enlarged side elevation view of one end of the current carrying hose assembly, with parts broken away and parts taken in the section.

Hose 10 of the current carrying hose assembly 12 starts with helically coiled two conductor wire 14, see FIG. 2. Two individual conductors 16 and 18 are each individually insulated to form single conductor insulated wires 20 and 22. These individual insulated wires are laid together and an insulating jacket is extruded over the pair to form two conductor wire 14. For most uses, number 18 WG high-strength conductor wires are suitable, with both the individual conductor insulations and the jacket insulation being made of semi-rigid polyvinyl chloride so that the conductors are each doubly insulated.

The two conductor wire 14 is wound on a mandrel to form the single start helix illustrated in FIG. 2. With this helix wound on a mandrel and serving as the beginning of the construction of the hose, 10, inner-layer 24 is placed over the helically wound double insulated two conductor wire. Inner-layer 24 can be installed in many different ways. The preferred way of doing it is on a mandrel by employing a continuous layer of thermoplastic film with spiral feeding in the presence of heat for the purpose of sealing on the outer surface of the helix, sealing the edges of the material as it is wound, and pulling the thermoplastic film against the mandrel between the helical wires. As taught in Fairchild U.S. Pat. No. 3,778,327 the wire assembly is helically wound on the mandrel and the polymer composition inner-layer 24 is also helically wound. The skewed rollers feed the tubular product. Suitable solvent adhesive is applied during winding to secure the insulated wire assembly and the helically wound tape into a stable structure. The inner-layer is thermoplastic material, preferably polyvinyl chloride.

Longitudinal reinforcing yarns 26 are laid lengthwise over the hose assembly over the inner-layer. These are preferably laid on during the spiral winding process of the inner-layer 24 or may be subsequently laid on. In the preferred embodiment, there are 18 such longitudinal reinforcing yarns. These yarns may be of synthetic polymer composition material construction or may be natural fiber. Because of the temperatures involved during the manufacture of hose 10, they must be of material which withstands the polyvinyl chloride thermoplastic adhesion temperature or adhesive solvent polyvinyl solvent.

On top of longitudinal reinforcing yarns 26, two helical reinforcing yarns 28 and 30 are wound. They are wound adjacent to sides of the two conductor wire assembly 14 and serve to push the inner-layer 24 down to the surface of the mandrel to form a smooth inside surface. This winding is preferably done on the same mandrel as the winding of inner-layer 24. Subsequent to the winding of the helical reinforcing yarns, outer cover layer 32 is installed. The outer cover layer is preferably a spirally wound poly-vinyl chloride tape wound directly onto the outer surface under such circumstances that it shrinks to conform to and seal to the construction already laid down on the mandrel. The winding of cover-layer 32 is also done as a spiral winding step on the original mandrel. Adhesive or thermoplastic attachment is used. After the helical winding on of the outer cover layer 32, the completed hose 10 is continuously advanced off the mandrel for finishing.

Figure 3:
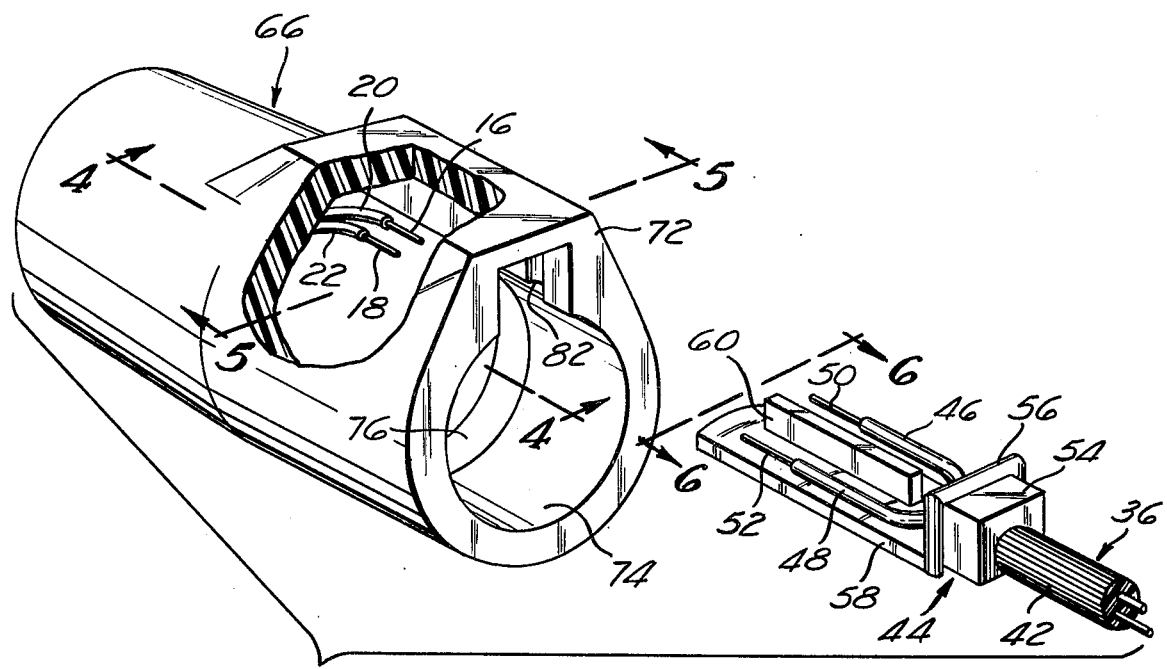
FIG. 3 is a further enlarged exploded perspective view with parts broken away and parts taken in section of the same end of the current carrying hose assembly particularly showing the hose connector cuff and the wire harness connection and strain relief.

In order to make connection between the two conductor wire assembly 14 wound into hose 10 and the utilization equipment for attachment to each end of the hose assembly, harnesses 34 and 36 are provided, see FIGS. 1, 2, 3, and 6. The harnesses are identical, except that harness 36 is provided with male plug 38 and harness 34 is provided with female plug 40. Accordingly, only harness 36 will be described in detail. As is seen in FIG. 2, harness 36 comprises two conductor cord 42 which is provided with plug 38 on one end and has molded on the other end strain relief body 44. Body 44 is directly and securely molded onto the insulator cover of two conductor cord 42 so that physical strain on the cord is transferred to body 44 rather than to the conductors in the cord. As is seen in FIG. 3, cord 42 has two insulated conductors 46 and 48 therein and these insulated conductors respectively contain cord wires 50 and 52. Thus, two conductor cord 42 is preferably formed out of separately insulated conductor wires covered by a cord body to hold the two insulated conductors together, as is common practice.

Strain relief body 44 includes end 54 of plug 44 which carries seal and stop shoulder 56 thereon. It is plug end 54 which is secured onto conductor cord 42. Plug end 54 carries platform 58 which is partly cylindrical in construction, see FIG. 6, to conform to the interior radius of the hose assembly. Extending upward from platform 58 is divider wall 60 which lies between conductors 46 and 48.

The ends of the insulated conductor wires 20 and 22 are stripped and the ends of harness insulated conductor wires 46 and 48 stripped. The stripped ends are respectively assembled into crimp wire connectors. Connector 62 as seen in FIG. 2 and receives wires 18 and 52. It is thereupon crimped. An identical connector lies on the other side of wall 60 and receives wires 16 and 50 and is also crimped. Thus, the wires are joined together in secure and firm mechanical and electrical connection.

End connectors 64 and 66 are cuffs which provide the means for fluid connection to the hose 10 and engage the strain relief bodies to prevent strain on the electrical connectors 62. End connector cuffs 64 and 66 are identical in nature. End connector cuff 66 is shown in detail. End connector cuff 66 is tubular in construction and is injection molded of a material similar and compatible to the other materials, for example, polyvinyl chloride. The hose end of connector cuff 66 has internal threads 68 of dimensions and pitch to receive the helical exterior of the hose defined by the helically wound conductor wires in the hose. The threads end at circumferentially facing stop shoulder 70 to limit the distance the hose can be screwed into the end connector. Bore 74 is open at the other end of the connector cuff and is of cylindrical configuration to receive a tubular fitting. It is in alignment with hose 10 for continuous fluid flow from the hose. Bore 74 may be provided with a detent notch 76 to aid in retaining a tube in the bore.

Figure 4:
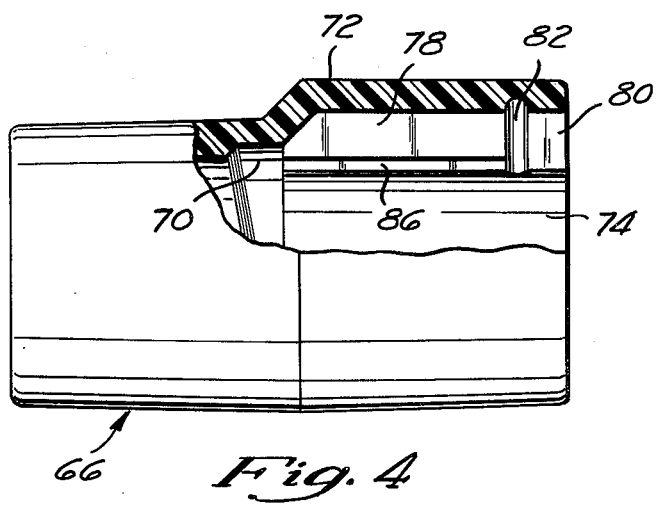
FIG. 4 is a section taken generally along line 4—4 of FIG. 3.
Figure 5:
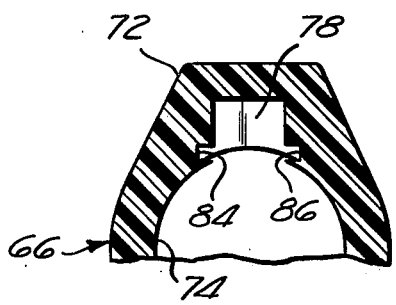
FIG. 5 is a section taken generally along line 5—5 of FIG. 3 with parts broken away.
Figure 6:
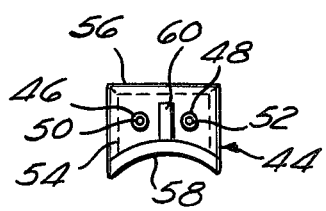
FIG. 6 is an end view of the strain relief body molded onto the harness wire as seen generally from along the line 6—6 of FIG. 3.

Boss 72 is formed on the side of connector cuff 66 adjacent bore 74. It contains pocket 78, see FIGS. 4 and 5, for reception of strain body 44. Opening 80 out of the pocket is of such size as to receive end plug 54. Adjacent opening 80, recess 82 receives seal and stop shoulder 56. Shoulders 84 and 86 at the open side of pocket 78 receive platform 58, which closes the bottom of the pocket and defines a continuous cylindrical bore in line with bore 74. When installed, divider wall 60 is substantially against the top of the pocket to positively separate the connectors 62 from each other. When located in position, body 44 stays in its place by virtue of the manner in which strain body 44 fits within its pocket. On assembly, the end connector cuff is slipped over the wiring harness and is screwed onto the end of the hose. The thread stop keeps the hose from being screwed on too far and assists in aligning the strain relief with its pocket. When the end connector is installed, adhesive may be applied to the thread thereof to retain it on the hose. Similarly, when the strain body is to be snapped into its pocket, adhesive may be applied.

This construction provides double insulated wires which resist abrasion and wear and provide a long life. Also, the use of the two wires in the same helix provides more strength and stiffness to the hose. Additionally, it is easier to make connections from two wires out of a pair rather than separate wires. The strain relief snaps into place and provides a firm, positive separation for the wire connectors. Inspection of the connectors can be achieved after connection of the wiring harness to the hose and during the assembly of the cuffs. After the strain relief is locked into the end cuffs, the two wire connectors 62 are mechanically, permanenty separated.

Furthermore, the hose assembly can be repaired by cutting off the end and installing a new wiring harness and end cuffs in the field, away from the factory by a qualified repairman. This is not possible with molded-on fittings.

This invention having been described as a preferred embodiment, it is clear that it is susceptible to numerous modifications and embodiments within the ability of those skilled in the art and without the exercise of the inventive faculty. Accordingly, the scope of this invention is defined by the scope of the following claims.

We claim:

1. An electric current and fluid carrying hose assembly comprising:
    a helically wound electrically conductive wire assembly wound to define a spaced helix where the helical pitch is greater than the width of the wire assembly and to define a generally cylindrical bore, said helix being formed of two double insulated electric conductor wires wound as a single start helix;
    an inner cover layer positioned over said helix and configured so that in the helical spaces it is positioned substantially on said cylindrical bore;
    a plurality of reinforcing yarns on said inner cover layer, said reinforcing yarns comprising a pair of helically wound reinforcing yarns wound on substantially the same pitch as said helix and lying adjacent said helix to pull said inner cover layer substantially to said cylindrical bore;
    an outer cover layer over said reinforcing yarns and said inner cover layer, said outer cover layer being attached to said inner cover layer and said inner cover layer being attached to said helix to form a reinforced electric current and fluid carrying hose; and
    first and second end connector cuffs having internal threads matching the helical pitch of said hose and screwed onto the ends of said hose, and first and second wire harnesses each having a strain relief body molded thereon, said strain relief body being secured into said end connector cuffs, said harnesses each having wires therein, first and second wires of said harness being connected to first and second wires of said wire assembly in said hose, said strain relief body further including a divider wall positioned between the pairs of connected wires to hold them separate.

2. An electric current and fluid carrying hose assembly comprising:
    a pair of helically wound electrical conductors defining a tubular bore and a cover on said helically wound conductors, said helically wound conductors and cover forming a hose; and
    an end connector cuff having screw threads therein of the same pitch and configured to screw onto the end of said hose on said helix defined by the helically wound conductors in said hose, said end cuff being screwed onto the end of said hose.

3. The assembly of claim 2 further including a wire harness, said wire harness having a pair of mutually insulated wires therein and having a strain relief body molded thereon, said strain relief body engaging in said end connector cuff so that strain on said wire harness is transmitted to said end connector cuff.

4. The assembly of claim 3 wherein there is a dividing wall formed onto said strain relief body, and said wires in said harness are connected to said wires in said hose helix, said connections being on opposite sides of said dividing wall.

5. The assembly of claim 4 wherein said connector cuff has a pocket therein and said strain relief body and said connections and said dividing wall are positioned within said pocket.

6. The assembly of claim 5 wherein said body also includes a platform, said connector cuff having a bore therein and said platform defining a portion of said bore at said pocket so that fluid passage through said assembly is unobstructed by said strain relief body.

7. The assembly of claim 6 wherein said pair of helically wound conductors in said hose comprises first and second wires each individually insulated and both being provided with an insulated cover to define a two conductor double insulated wire assembly helically wound into a single start helix.

8. A fluid and electric current carrying hose comprising:
    first and second electrical conductor wires, separate insulation on each of said first and second electrical conductor wires, an insulator sheath formed around both of said first and second separately insulated conductor wires to form a two conductor double insulated wire assembly, said wire assembly being helically wound as a single start helix with a spiral pitch greater than the width of said wire assembly so that there is spacing between successive turns of said helix, said helix defining a tubular bore;
    a resilient covering laid over said helix and secured to said helix and configured to lie substantially on such bore in the spaces between said helix;
    first and second end connector cuffs having internal threads matching the helical pitch of said hose and screwed onto the ends of said hose, and
    first and second wire harnesses each having a strain relief body molded thereon, said strain relief body being secured into said end connector cuffs, said harnesses each having wires therein, first and second wires of said harness being connected to said first and second conductor wires in said hose, said strain relief body further including a divider wall positioned between the pairs of connected wires to hold them separate.

9. A fluid and electric current carrying hose comprising:

first and second electrical conductor wires, separate insulation on each of said first and second electrical conductor wires, an insulator sheath formed around both of said first and second separately insulated conductor wires to form a two conductor double insulated wire assembly, said wire assembly being helically wound as a single start helix with a spiral pitch greater than the width of said wire assembly so that there is spacing between successive turns of said helix, said helix defining a tubular bore;

a resilient covering laid over said helix and secured to said helix and configured to lie substantially on such bore in the spaces between said helix, wherein said covering is an inner cover layer and there is additionally an outer cover layer positioned over said inner cover layer and secured to said inner cover layer at least over said helix;

first and second helically wound reinforcing yarns wound on said inner cover layer on the same pitch as said helix and adjacent to said helix to hold said inner cover layer substantially to said bore, wherein said helically wound reinforcing yarns are between said layers and there additionally are a plurality of longitudinally positioned reinforcing yarns between said cover layers;

first and second end connector cuffs having internal threads matching the helical pitch of said hose and screwed onto the ends of said hose, first and second wire harnesses each having a strain relief body molded thereon, said strain relief body being secured into said end connector cuffs, said harnesses each having wires therein, and first and second wires of said harness being connected to said first and second conductor wires in said hose, said strain relief body further including a divider wall positioned between the pairs of connected wires to hold them separate.

10. An electric current and fluid carrying hose assembly comprising:

a helically wound electrically conductive wire assembly wound to define a spaced helix where the helical pitch is greater than the width of the wire assembly and to define a generally cylindrical bore;

an inner cover layer positioned over said helix and configured so that in the helical spaces it is positioned substantially on said cylindrical bore;

a plurality of reinforcing yarns on said inner cover layer;

an outer cover layer over said reinforcing yarns and said inner cover layer, said outer cover layer being attached to said inner cover layer and said inner cover layer being attached to said helix to form a reinforced electric current and fluid carrying hose;

first and second end connector cuffs having internal threads matching the helical pitch of said hose and screwed onto the ends of said hose;

first and second wire harnesses each having a strain relief body molded thereon, said strain relief body being secured into said end connector cuffs, said harnesses each having wires therein, and first and second wires of said harness being connected to first and second wires of said wire assembly in said hose, said strain relief body further including a divider wall positioned between the pairs of connected wires to hold them separate.

11. An electric current and fluid carrying hose assembly comprising:

a helically wound electrically conductive wire assembly wound to define a spaced helix where the helical pitch is greater than the width of the wire assembly and to define a generally cylindrical bore;

an inner cover layer positioned over said helix and configured so that in the helical spaces it is positioned substantially on said cylindrical bore;

a plurality of longitudinally extending reinforcing yarns on said inner cover layer;

an outer cover layer over said reinforcing yarns and said inner cover layer, said outer cover layer being attached to said inner cover layer and said inner cover layer being attached to said helix to form a reinforced electric current and fluid carrying hose, said helix being formed of two double insulated electric conductor wires wound as a single start helix;

first and second end connector cuffs having internal threads matching the helical pitch of said hose and screwed onto the ends of said hose;

first and second wire harnesses each having a strain relief body molded thereon, said strain relief body being secured into said end connector cuffs, said harnesses each having wires therein, and first and second wires of said harness being connected to first and second wires of said wire assembly in said hose, said strain relief body further including a divider wall positioned between the pairs of connected wires to hold them separate.

* * * * *